United States Patent [19]

Mumford

[11] Patent Number: 4,781,745

[45] Date of Patent: Nov. 1, 1988

[54] REGISTERING DEVICE FOR GLASS ARTICLE HANDLING COMPONENTS

[75] Inventor: Eustace H. Mumford, Ottawa Lake, Mich.

[73] Assignee: Glasstech International L.P., Scarsdale, N.Y.

[21] Appl. No.: 52,025

[22] Filed: May 19, 1987

[51] Int. Cl.$^4$ .............................................. C03B 11/06
[52] U.S. Cl. ....................................... 65/323; 65/273; 65/305; 65/307; 100/219
[58] Field of Search ................. 65/323, 305, 307, 273; 100/219

[56] References Cited

U.S. PATENT DOCUMENTS 1,845,654  2/1932  Flexon ............................. 65/323 X
3,459,526  8/1969  Stickel et al. ........................ 65/305
3,558,298  1/1971  Carmi et al. ...................... 65/305 X

*Primary Examiner*—Arthur Kellogg
*Attorney, Agent, or Firm*—Brooks & Kushman

[57] ABSTRACT

A device (10) for registering together two cooperable glass article handling components (12,14) is disclosed as including a first registering member (16) on one of the handling components and a second registering member (18) on the other component. The registering members (16,18) are movable toward one another in a direction of registration A,A' and one of the registering members includes fixedly spaced rollers (20) for engaging the other registering member with rolling contact to provide registration between the handling components (12, 14) during glass article handling.

10 Claims, 2 Drawing Sheets

REGISTERING DEVICE FOR GLASS ARTICLE HANDLING COMPONENTS

TECHNICAL FIELD

This invention relates to a device for registering together two cooperable glass article handling components.

BACKGROUND ART

Registration devices are used with hot glass sheet handling components such as glass sheet roller conveyors, glass sheet molds, glass sheet press rings and glass sheet quench rings to assure that these components are properly aligned during hot glass sheet working. These devices allow for accurate processing of the hot glass sheet and a high yield of quality glass product.

Registration devices are known to include a spade and slot arrangement whereby one glass sheet handling component has the spade mounted on it and the other cooperable glass sheet handling component has the slot mounted on it. The spade is received in the slot to thereby align the two components for hot glass sheet handling. This spade and slot registration means is insufficient for accurate hot glass sheet handling because of recurring friction between the spade and slot each time the handling apparatus is registered and separated.

After repeated registrations, wear on the spade and slot create a loose fit and diminish accuracy of alignment of the glass handling components. Also, the friction that occurs during registration necessitates that when two or more registration devices are used together with a pair of handling components, lesser tolerances than acceptable for processing a quality product must be used to assure registration of the registration devices given the thermal expansion and contraction of the components.

DISCLOSURE OF INVENTION

An object of the present invention is to provide a registration device for use with two cooperable glass sheet handling components which provide an improvement in registration between the handling components during hot glass sheet handling.

In carrying out the above object and other objects of the invention, a registering device constructed in accordance with the present invention comprises a first registering member defined by a pin on one of said handling component and a second registering member defined by at least a pair of fixedly spaced rollers having an opening therebetween on the other component. The registering members are movable toward one another in a direction of registration. The roller spacing is such that the pin is in rolling contact with the rolelrs as the pin is inserted into the opening for engaging the other registering member to provide registration between the handling components during hot glass sheet handling.

In the preferred embodiment of the invention, one pair of rollers rotatably mounted about roller is axes extending in a perpendicular direction to the direction of registration. These rollers have an elongated shape and oppose each other. In this arrangement, the first registering member is adjustably aligned with the second registering member along a major axis extending between and parallel to the roller axis and also is confiningly registered along a minor axis. The major and minor axes are perpendicular to each other and both major and minor axes are perpendicular to the direction of registration.

Alternatively, two pairs of opposed rollers are rotatably mounted about two pairs of perpendicularly extending roller axes. These roller axes are perpendicular to each other and also are perpendicular to the direction of registration for confiningly registering the first and second members about the direction of registration.

Preferably, the registering device includes first and second connectors for respectively mounting the first and second registering members to the pair of handling components. Preferably, the connectors include threaded fasteners together with elongated slot and bolt connections that provide adjustable mounting of the first and second members on the handling components. Most preferably, the registering device includes a base plate and a positioning bolt for adjusting the alignment of the handling components when registered.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
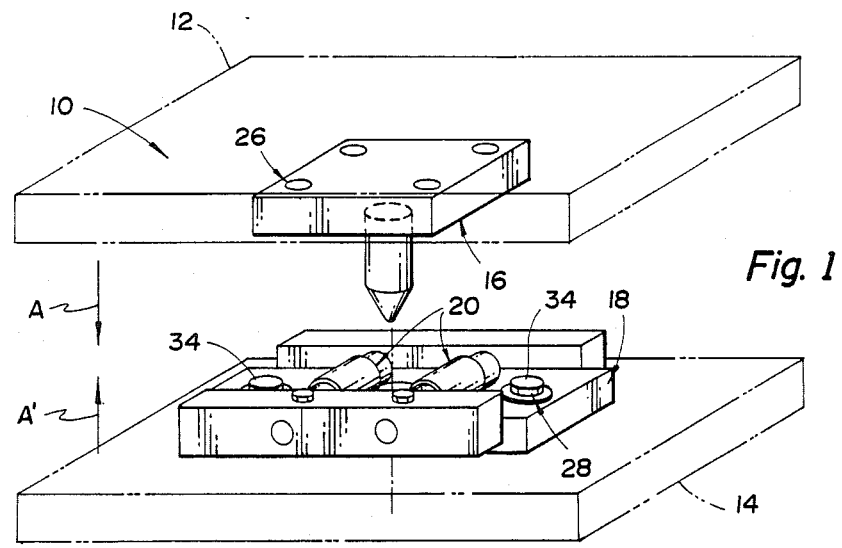
FIG. 1 is a perspective view of a registering device constructed in accordance with the present invention illustrating first and second registering members.

Referring to FIG. 1 of the drawings, a registering device constructed in accordance with the present invention is generally indicated by reference numeral 10 and is used with two cooperable glass sheet handling components 12 and 14 representatively shown in phantom. These cooperable hot glass sheet handling components 12,14 include but are not limited to roller conveyors, forming molds, press rings and quench rings. As is hereinafter more fully described, the registering device 10 provides alignment of the cooperable glass sheet handling components 12,14 as the components are moved toward and engaged with each other for glass sheet handling.

As shown in FIG. 1, the registering device 10 comprises a first registering member 16 defined by a pin 22 on one of the handling components 12 and a second registering member 18 defined by a pair of fixedly spaced rollers 20 mounted on the other handling component. The registering members 16,18 are movable toward one another in a direction of registration indicated by arrows labeled A,A'. The roller spacing is such that the pin 22 is in rolling contact with the rollers 20 as the pin is inserted into the opening for engaging the other registering member to provide registration between the handling components 12,14 to assure proper alignment during glass sheet handling.

Figure 2:
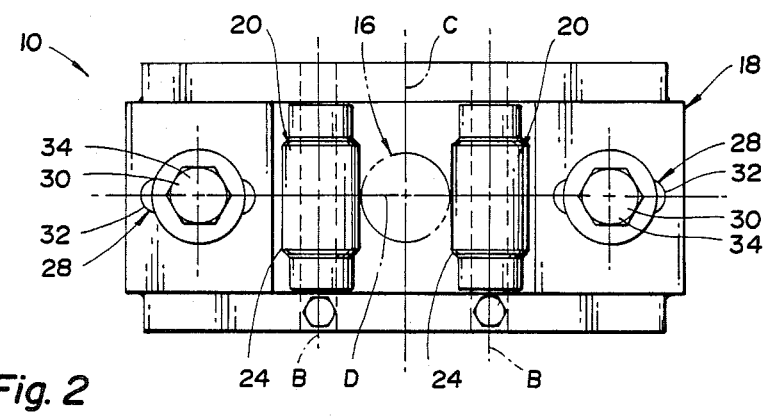
FIG. 2 is a plan view of the second registering member illustrating elongated rollers and an adjustable mount.
Figure 3:
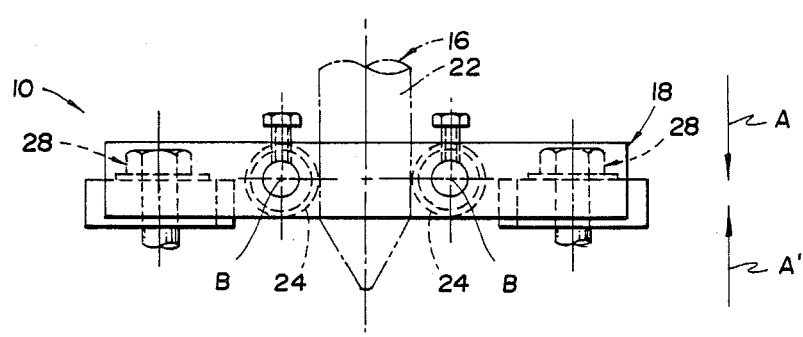
FIG. 3 is a side view of the second registering member shown in engagement with the first registering member.

FIGS. 2 and 3 illustrate the second registering member 18 of the registering device 10 in an engaged position with the pin 22, shown in phantom, of the first registering member 16. The pin 22 is shown here having a spike shape although any contour which provides registration can be used. The rollers 20 shown are a pair of elongated rollers 24 rotatably mounted about roller axes B extending in a perpendicular direction to the direction of registration A,A'. The elongated rollers 24, shown, oppose each other. This arrangement of elongated rollers 24 allows the first registering member 16 to be adjustably aligned with the second registering member 18 along a major axis C extending between and parallel to the roller axes B and also confines registration of the first registration member along a minor axis D. Major axis C and axis minor D are perpendicular to each other and both axes also are perpendicular to the direction of registration A,A'. This adjustable alignment along the major axis C is desirable when two or more registering devices 10 are used in combination and also when different expansion and contraction occurs to the handling components when handling the hot glass sheets.

As seen in FIGS. 1, 2, and 3, the registering device 10 includes first and second connectors 26,28 for respectively mounting the first and second registering members 16,18 to the pair of handling components 12,14. These connectors 26,28 include threaded fasteners 30. Most preferably, the connectors comprise elongated slot 32 and bolt 34 connections that provide adjustable mounting of the first and second registering members 16,18 on the handling components 12,14, best seen in FIG. 2. This adjustable mounting arrangement provides for easily adjustable alignment to correct and maintain accuracy of registration between the first and second registering members 16,18 and result in increased accuracy of registering the handling components 12,14.

Figure 4:
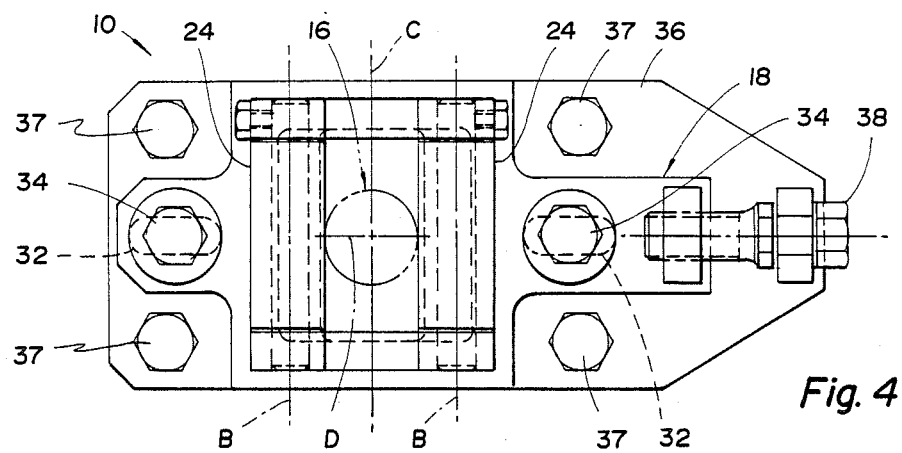
FIG. 4 is a plan view of a preferable adjustable mount for the registering device.

FIG. 4 illustrates another mounting arrangement for mounting the registering members 16,18 to a pair of handling components. As illustrated, the second registering member 18 further includes and is connected to a base plate 36 which is fastened to a handling component, not shown, by mechanical fasteners 37. The elongated rollers 24 are movable with respect to the base plate 36 through the combined features of the elongated slots 32 and a positioning bolt 38 which, as the bolt is rotated, adjusts the position of the rollers 24 relative to the base plate 36.

Figure 5:
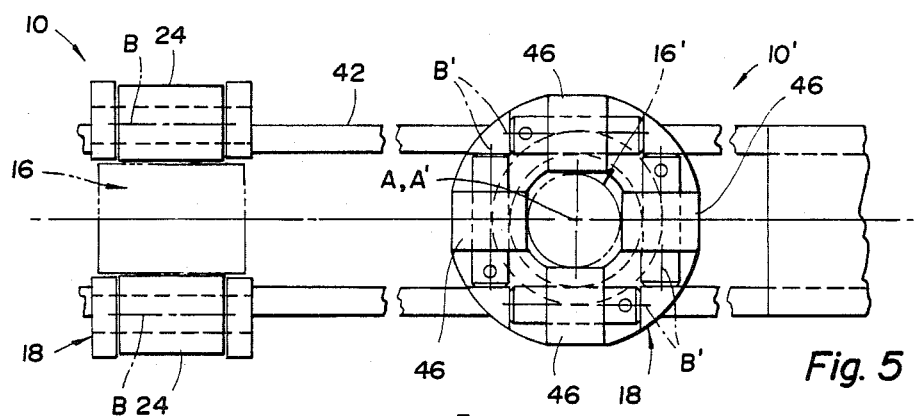
FIG. 5 is a plan view of two second registering members mounted in an assembly arrangement.

FIG. 5 illustrates two dissimilar registering devices used together in an assembly including two registering devices 10,10'. The first registering device 10 as discussed above includes a first registering member 16, shown in phantom on a handling component, not shown, and a second registering member 18 on the other component 42. Registering members 16,18 are movable toward one another in a direction of registration A,A'. The second registering member 18 of the first registering device 10 has a pair of opposed elongated rollers 24 rotatably mounted about roller axes B extending in a perpendicular direction to the direction of registration A,A' for engaging the other registering member 16 with rolling contact.

With continued reference to FIG. 5, the second registering device 10' is spaced from the first registering device 10 and includes a first registering member 16', shown in phantom on the handling component, not shown, and a second registering member 18' on the other component 42. The registering members 16',18' are similarly movable toward one another in the direction of registration A,A'. The second registering member 18' of the second registering device 10' has two pair of opposed rollers 46 rotatably mounted about roller axes B' extending in a perpendicular direction to the direction of registration A,A' and also has one pair of the roller axis B' extending perpendicular to the roller axes B of the first registering device 10 for engaging the other registering member 16' of the second registering device with rolling contact. The assembly of first and second registering devices 10,10' allow the pair of handling components to be translationally registered for cooperative glass sheet handling while also allowing for expansion and contraction of the components that takes place with the increase and decrease of temperature.

Figure 6:
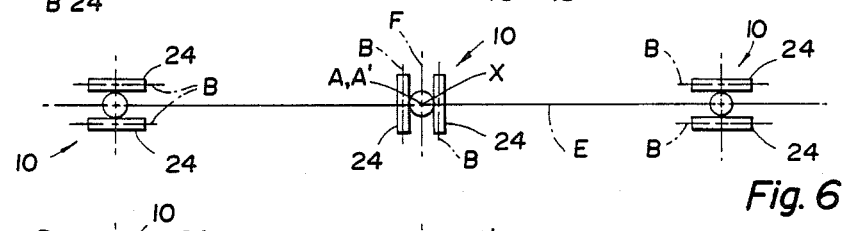
FIG. 6 is a schematic view of three registering devices illustrated in a linear assembly arrangement.
Figure 7:
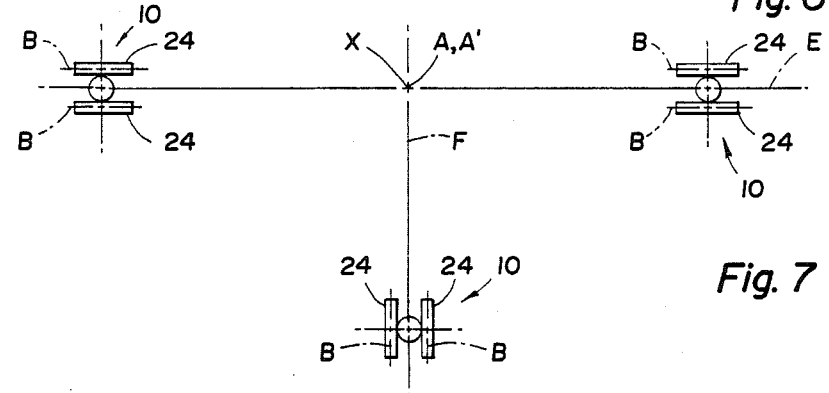
FIG. 7 is a schematic view of three registration devices illustrated in a non linear assembly arrangement.

FIGS. 6 and 7 illustrate schematically how three registering devices 10 can be utilized to provide both translational and rotational registration of a pair of glass sheet handling components for cooperative glass sheet handling. Three registering devices 10, previously discussed, are mounted in a spaced relationship on two cooperable glass sheet handling components. Each device 10 has a pair of opposed elongated rollers 24 rotatably mounted about roller axes B extending in a perpendicular direction to the direction of registration for engaging the other registering members with rolling contact. As shown, two of the registration devices 10 have roller axes B extending coincidentally with each other and the third device has roller axes extending perpendicular to the other two. In this arrangement, the glass handling components are registerable about the intersection X of the axes E,F extending between and parallel to the roller axes B.

While the best mode for carrying out the invention has been described in detail, those familiar with the art to which this invention relates will recognize various alternative designs and embodiments for practicing the invention as defined by the following claims.

What is claimed is:

1. A device for registering together two cooperable glass article handling components, said device comprising: a first registering member defined by a pin on one of said handling components; and a second registering member defined by at least a pair of fixedly spaced rollers having an opening therebetween on the other component; said registering members being movable toward one another in a direction of registration; said roller spacing being such that said pin is in rolling contact with said rollers as said pin is inserted into said opening for engaging the other registering member to thereby provide accurate registration between the handling components during glass article handling.

2. A device as in claim 1 wherein said pair of rollers are rotatably mounted about roller axes extending in a perpendicular direction to the direction of registration.

3. A device as in claim 2 wherein the pair of rollers have an elongated shape and oppose each other; said first registering member being adjustably aligned with the second registering member along a major axis extending between and parallel to the roller axes and also being confiningly registered along a minor axis; said major and minor axes being perpendicular to each other and both axes also being perpendicular to the direction of registration.

4. A device as in claim 1 including two pairs of opposed rollers rotatably mounted about roller axes; said roller axes for each pair of opposed rollers being perpendicular to each other and all the roller axes being perpendicular to the direction of registration for confiningly registering the first and second members about the direction of registration.

5. A device as in claim 1 further including first and second connectors for respectively mounting the first and second registering members to the pair of handling components.

6. A device as in claim 5 wherein said connectors include threaded fasteners.

7. A device as in claim 6 wherein the connectors comprise elongated slot and bolt connections that provide adjustable mounting of the first and second members on the handling components.

8. A device as in claim 7 further including a base plate and a positioning bolt for adjusting the members on the handling components.

9. An assembly of devices for registering together two cooperable glass article handling components, said assembly comprising: a first device including a first registering member defined by a pin on one of said handling components, and a second registering member defined by at least a pair of fixedly spaced rollers having an opening therebetween on the other component, said registering members being movable toward one another in a direction of registration, said pair of opposed rollers being of an elongated shape rotatably mounted about roller axes extending in a perpendicular direction to the direction of registration, said roller spacing being such that said pin is in rolling contact with said rollers as said pin is inserted into said opening for engaging the other registering member; and a second device spaced from said first registration device and including a first registering member defined by a pin on one of said handling components, and a second registering member defined by a pair of fixedly spaced rollers having an opening therebetween on the other component, said registering members being movable toward one another in the direction of registration, said opposed rollers being rotatably mounted about roller axes extending in a perpendicualr direction to the direction of registration and also extending perpendicular to the roller axes of the first device, said roller spacing being such that said pin is in rolling contact with said rollers as said pin is inserted into said opening for engaging the other registering member of the second device; said first and second registering members being engageable with rolling contact whereby said first and second handling components are translationally registerable for cooperative glass handling.

10. An assembly of devices for registering together two cooperable glass article handling components, said assembly of devices comprising: at least three devices; said devices each including a first registering member defined by a pin on one of said handling components, and a second registering member defined by at least a pair of fixedly spaced rollers of an elongated shape rotatably mounted about roller axes extending in a perpendicular direction to the direction of registration having an opening therebetween on the other component, said registering members being movable toward one another in a direction of registration, said roller spacing being such that said pin is in rolling contact with said rollers as said pin is inserted into said opening; said devices being mounted in a spaced relationship on the cooperable glass article handling components and two of said devices having roller axes extending coincidently with each other and the other device having roller axes extending perpendicular thereto, whereby said handling components are translationally and rotationally registerable together for cooperable glass article handling.

* * * * *